United States Patent
Flack et al.

(10) Patent No.: US 11,641,337 B2
(45) Date of Patent: May 2, 2023

(54) CDN CONFIGURATION TUNING FOR TRAFFIC SHARE

(71) Applicant: Akamai Technologies Inc., Cambridge, MA (US)

(72) Inventors: Martin T. Flack, Denver, CO (US); Utkarsh Goel, San Mateo, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/648,227

(22) Filed: Jan. 18, 2022

(65) Prior Publication Data

US 2022/0255893 A1    Aug. 11, 2022

Related U.S. Application Data

(63) Continuation of application No. 17/039,588, filed on Sep. 30, 2020, now Pat. No. 11,233,768.

(51) Int. Cl.
*H04L 61/30* (2022.01)
*H04L 67/10* (2022.01)
*H04L 67/1029* (2022.01)
*H04L 67/1008* (2022.01)

(52) U.S. Cl.
CPC .............. *H04L 61/30* (2013.01); *H04L 67/10* (2013.01); *H04L 67/1029* (2013.01); *H04L 67/1008* (2013.01)

(58) Field of Classification Search
None
See application file for complete search history.

(56) References Cited

U.S. PATENT DOCUMENTS

| | | | | |
|---|---|---|---|---|
| 7,603,439 B2* | 10/2009 | Dilley | .................. | H04L 67/568 |
| | | | | 711/122 |
| 7,797,426 B1* | 9/2010 | Lyon | .................. | H04L 67/1021 |
| | | | | 709/227 |
| 8,073,940 B1* | 12/2011 | Richardson | ......... | H04L 67/1023 |
| | | | | 709/200 |
| 9,451,045 B2* | 9/2016 | Newton | ................ | H04L 41/509 |

(Continued)

OTHER PUBLICATIONS

U.S. Appl. No. 17/039,588, filed Sep. 30, 2020, (issued as U.S. Pat. No. 11,233,768).

(Continued)

*Primary Examiner* — Lashonda Jacobs-Burton

(57) ABSTRACT

This document relates to a CDN balancing mitigation system. An implementing CDN can deploy systems and techniques to monitor the domains of content provider customers with an active DNS scanner and detect which are using other CDNs on the same domain. This information can be used as an input signal for identifying and implementing adjustments to CDN configuration. Both automated and semi-automated adjustments are possible. The system can issue configuration adjustments or recommendations to the implementing CDN's servers or to its personnel. These might include "above-SLA" treatments intended to divert traffic to the implementing CDN. The effectiveness can be measured with the multi-CDN balance subsequently observed. The scanning and adjustment workflow can be permanent, temporary, or cycled. Treatments may include a variety of things, such as more cache storage, routing to less loaded servers, and so forth.

12 Claims, 3 Drawing Sheets

(56) References Cited

U.S. PATENT DOCUMENTS

| | | | |
|---|---|---|---|
| 10,135,620 B2* | 11/2018 | Richardson | H04L 63/20 |
| 10,440,148 B1* | 10/2019 | Richter | H04L 41/0896 |
| 10,623,408 B1* | 4/2020 | Marshall | H04L 61/4511 |
| 10,848,586 B2* | 11/2020 | Zhu | H04L 67/5683 |
| 10,862,852 B1* | 12/2020 | Thunga | H04L 67/565 |
| 11,134,134 B2* | 9/2021 | Uppal | H04L 67/63 |
| 11,233,768 B1 | 1/2022 | Flack | |
| 2008/0222291 A1* | 9/2008 | Weller | H04L 65/612 707/E17.032 |
| 2011/0082785 A1* | 4/2011 | Weller | H04L 65/612 705/37 |
| 2012/0130871 A1* | 5/2012 | Weller | H04L 67/1001 705/30 |
| 2014/0047104 A1* | 2/2014 | Rodriguez | H04L 67/1023 709/224 |
| 2014/0122698 A1* | 5/2014 | Batrouni | H04L 47/726 709/224 |
| 2014/0122725 A1* | 5/2014 | Batrouni | H04L 67/101 709/226 |
| 2016/0294701 A1* | 10/2016 | Batrouni | H04L 67/10 |
| 2017/0094009 A1* | 3/2017 | Wistow | H04L 61/4511 |

OTHER PUBLICATIONS

Transmittal Letter titled Communication Under MPEP § 609.02, submitted with this SB/08, dated Jan. 18, 2022, 1 page.

* cited by examiner

CDN CONFIGURATION TUNING FOR TRAFFIC SHARE

BACKGROUND

Technical Field

This application generally relates to the delivery of content over the Internet and to content delivery networks.

Brief Description of the Related Art

Content delivery networks (CDNs) typically use cache servers (usually reverse proxy cache servers) to improve the delivery of websites, web applications, and other online content such as streaming media. A CDN usually has many servers distributed across the Internet, e.g., located in end user access networks (sometimes these servers are referred to as edge servers), peering points, or other places. An end user client desiring content locatable under a domain being handled by the CDN is directed by a request routing mechanism to a selected server in the CDN. This may be accomplished for example using a DNS-based request routing mechanism, in which the CDN's domain name service returns an IP address of a CDN server in response to a name lookup for the domain, as known in the art.

In a typical operation, for example, a content provider identifies a content provider domain that it desires to have served by the CDN. The CDN service provider associates (e.g., via a canonical name, or CNAME, or other aliasing technique) the content provider domain with a CDN hostname, and the CDN service provider provides that CDN hostname to the content provider. When a DNS query to the content provider domain is received at domain name servers authoritative for that domain (which may be servers operated by the content provider or servers operated by a DNS service provider for the content provider), those servers respond by returning (CNAME) the CDN hostname. That hostname points to the CDN, so that hostname is then resolved through the CDN name service. To that end, the CDN name service returns one or more IP addresses. The requesting client application (e.g., browser) then makes a content request (e.g., via HTTP or HTTPS or other protocol) to a CDN server associated with the IP address. The request includes a Host header that includes the original content provider domain or sub-domain. Upon receipt of the request with the Host header, the CDN server checks its configuration file to determine whether the content domain requested is actually being handled by the CDN. If so, the CDN server applies its content handling rules and directives for that domain, or for URI paths in the request, as specified in the configuration. These content handling rules and directives may be located within an XML-based "metadata" configuration file. Thus, the domain name is bound to (associated with) a particular configuration file, which contains the rules, settings, etc., that the CDN server should use for that request.

Due to the aforementioned request routing mechanism, the end-user client makes a content request for a desired object to the CDN server (e.g., using HTTP or other application layer protocol that may be used to facilitate an API). The CDN server maintains a content cache (also referred to, equivalently, as an object cache). The server searches this cache for the object that the client requested. If it locates an object and the object is not expired and otherwise valid to serve (cache hit), the end-user request can be served out of cache. If not (cache miss), the server may need to fetch the object from another server in the CDN (e.g., using a cache hierarchy model, as described in U.S. Pat. No. 7,603,439), often referred to as a parent server, or from an origin server associated with the content provider that is associated with the domain of the requested content. Requests sent to the parent server that are lacking the requested object can be then issued to the origin infrastructure; the origin is responsible for issuing an authoritative answer for the object.

In some cases, a client may request a non-cacheable object. The CDN server can fetch this object from origin directly or via a parent, in much the same way as described above for a cache miss.

In these ways, the content provider can make its website, web application, enterprise tool, or other online property available to end-users via the CDN in an improved fashion. More information about cache hierarchies and a tiered distribution system in a CDN is found in U.S. Pat. No. 7,133,905, the teachings of which are hereby incorporated by reference in their entirety. A description of optimal route selection in a CDN (e.g, to reach a parent or origin server) is described in U.S. Pat. No. 7,274,658, the teachings of which are hereby incorporated by reference in their entirety. Additional information on CDN technologies can be found in the following documents, the teachings of all of which are hereby incorporated by reference in their entirety: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

It is also known in the art, by others, for content providers to employ a strategy of using multiple different delivery platforms, e.g., more than one commercial CDN, or a commercial CDN in combination with an in-house CDN infrastructure, to deliver their content online. This is commonly referred to as CDN balancing or a multi-CDN strategy. CDN balancing can be thought of as a kind of load-balancing, however, load is not necessarily the only factor considered.

For example, a content provider can configure its DNS records such that over a given period of time, as end user clients request resolution of one of the content provider's DNS domain names (e.g., for one of their websites), the domain will resolve to point to a first CDN sixty percent of the time, while the other forty percent it will point to a second CDN. In addition to configuring desired percentages over time, the resolution and determination of which CDN to select could also be based on the geographic location of the end user client, or other characteristics of the end user client (or the end user client's DNS or access network), and/or the performance of the CDN.

A known service provider named Cedexis (now Citrix) provides a DNS service that offers CDN balancing by automatically distributing client request traffic across multiple CDNs (e.g., based on some metric like load, responsiveness, client network, or percentages). US Patent Publication No. 2012/0246290 by Cedexis describes "a method for providing access to an Internet resource includes receiving a DNS query including a hostname to be resolved, receiving status data, invoking a code by a name indicated by the hostname, conveying the status data to the code, receiving from the code a selection of an infrastructure [such as a CDN], and generating a DNS response directing a resolution to the infrastructure." The selection can be made based on cost and performance information.

CDN balancing services may be commercial, such as Cedexis, TurboBytes, MUX, Azure Traffic Manager, or Cloudinary; or home-grown. A CDN balancing service may employ a variety of configurations, but one common approach is to shift traffic to the CDN that is performing best at a given time. This is not necessarily a monolithic worldwide decision, but one made granularly based on localized metrics. Because this is typically automated and based on periodic HTTP probes, when a CDN improves service in measurable ways against certain metrics (e.g., HTTP objects load faster; overall, or per some single metric such as connection time, time to first byte, time to last byte, etc), no human action is necessarily required to shift more traffic to that CDN—it happens automatically by virtue of the CDN balancing system in use. In general, CDN balancers typically work as follows: (i) an end user client makes a DNS request for a content provider's hostname to its ISP's recursive DNS resolver, (ii) assuming the answer is not cached, the resolver queries the authoritative DNS server of the content provider, (iii) the content provider's authoritative DNS returns an alias (e.g., a CNAME) pointing to a hostname that is managed by the CDN balancer's DNS system. (iv) The DNS resolver thus queries that hostname using the CDN balancing DNS system. That system considers the hostname, the content provider's provided configuration for the hostname, looks at relevant performance metrics, and the location or network of the DNS resolver and/or any client subnet. (v) The CDN Balancer returns an answer based on such factors—the answer is typically a CNAME to a selected CDN's hostname.

It is known in the art, by others, to be able to detect the aforementioned multi-CDN strategies. Known and public services like Farsight Security's DNS-DB, which collects DNS resolution over time and from many different Internet vantage points, and webpagetest.org, which also examines the DNS lookup process, make it possible to identify the CDN that is delivering a particular site, and whether the website is using a multi-CDN delivery strategy as mentioned above. It can be done by looking at the CNAME records, or the IP address and performing a reverse whois lookup. This means that one can apply techniques such as substring and regular expression matches to find known CDN identifiers within the CNAME and PTR values, or ASN mapping based on IP address values; as well as employing matches to IP address ranges known to be used by CDNs and cloud providers, or ASN matches on the resolved IP addresses. Such techniques are well known in the art, by others.

Hence, a CDN (itself or through a vendor) can explore the market for CDNs using known techniques to probe CDN delegations of websites, usually accomplished via DNS. By making a series of DNS queries and studying the CNAME and A/AAAA records returned, it is possible to deduce the CDN in usage for that particular domain in that particular answer. As noted, by making this request to many public DNS servers which will return answers to anyone, across the world, and over time, it is possible to collect sufficient data to determine aggregate choices and trends in CDN. A website (whether providing web streaming video, web API, or any web service) may use one CDN at one point in time, then migrate to another entirely. It may also "balance" traffic between two or more CDNs, for reasons of cost, performance, or functionality. Those balancing choices may be made by the content provider directly or delegated to a third-party CDN balancing service, e.g., one of the aforementioned commercial vendors in the business of enabling CDN management. A particular CDN could even provide the CDN balancing service. The process of routinely probing DNS records in an automated fashion for a list of domains to infer CDN information is referred to as "active scanning". (Note that making an HTTP or other application layer request to the domain is not necessary for such scanning, although that can yield additional information from headers or the payload.) Similar information can be purchased and accessed through a vendor, such as the aforementioned Farsight, although limitations on the breadth and depth of the data may exist from vendors, as their methodology may differ from active scanning.

CDN companies use this type of DNS-derived market intelligence to inform their understanding of their overall market share; and monitor customers, prospects, and important websites. Marketing, Sales, and Product Management are the primary recipients of the data, to inform human follow-up actions: adjust competitive marketing, adjust sales and care with customers using competitors or Do-It-Yourself CDNs (DIY CDN, also referred to as 'in-house' CDN), and adjust product designs or network deployments to be more competitive.

While CDN balancing, and manual and automated detection of CDN balancing is known in the art by others, such intelligence is used merely for business insight. The teachings hereof leverage intelligence on CDN balancing—how traffic is being split across CDNs at a given time and for a given locale—as a novel signal for discovering and implementing adjustments in the CDN configuration and architecture to improve performance and traffic share, in both automated and semi-automated ways.

The teachings presented herein improve the functioning of a computer system itself, improving the object fetch function in an individual server as well as that of a larger distributed system composed of many such servers. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection.

In one aspect, this document relates to a CDN balancing mitigation system. An implementing CDN can deploy systems to monitor the domains of content providers with an active DNS scanner, detecting which are using other CDNs (or DIY) on the same domain, e.g., via automatic CDN balancing. This information can be used as a data signal for identifying and implementing adjustments to CDN configuration. Both automated and semi-automated adjustments are possible. The system can issue configuration adjustments or recommendations to the implementing CDN servers or personnel. These adjustments and recommendations might include "above-SLA" treatments intended to divert traffic to the implementing CDN. The effectiveness can be measured with the multi-CDN balance seen subsequently in DNS, as CDN balancing is automatically or manually adjusted to reward superior performance. The monitoring and configuration adjustment workflow can be permanent, temporary, or cycled. Configuration adjustments in the CDN may include more cache storage (or priority in cache eviction decisions), routing to less loaded servers, using more expensive fiber routing, and other features and/or settings. However, the teachings hereof do not depend on the use of any particular configuration adjustment. Both well known and any future CDN features and settings may be employed with the teachings of this document.

The original claims are incorporated by reference into this section, in their entireties.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

Overview

Figure 1:
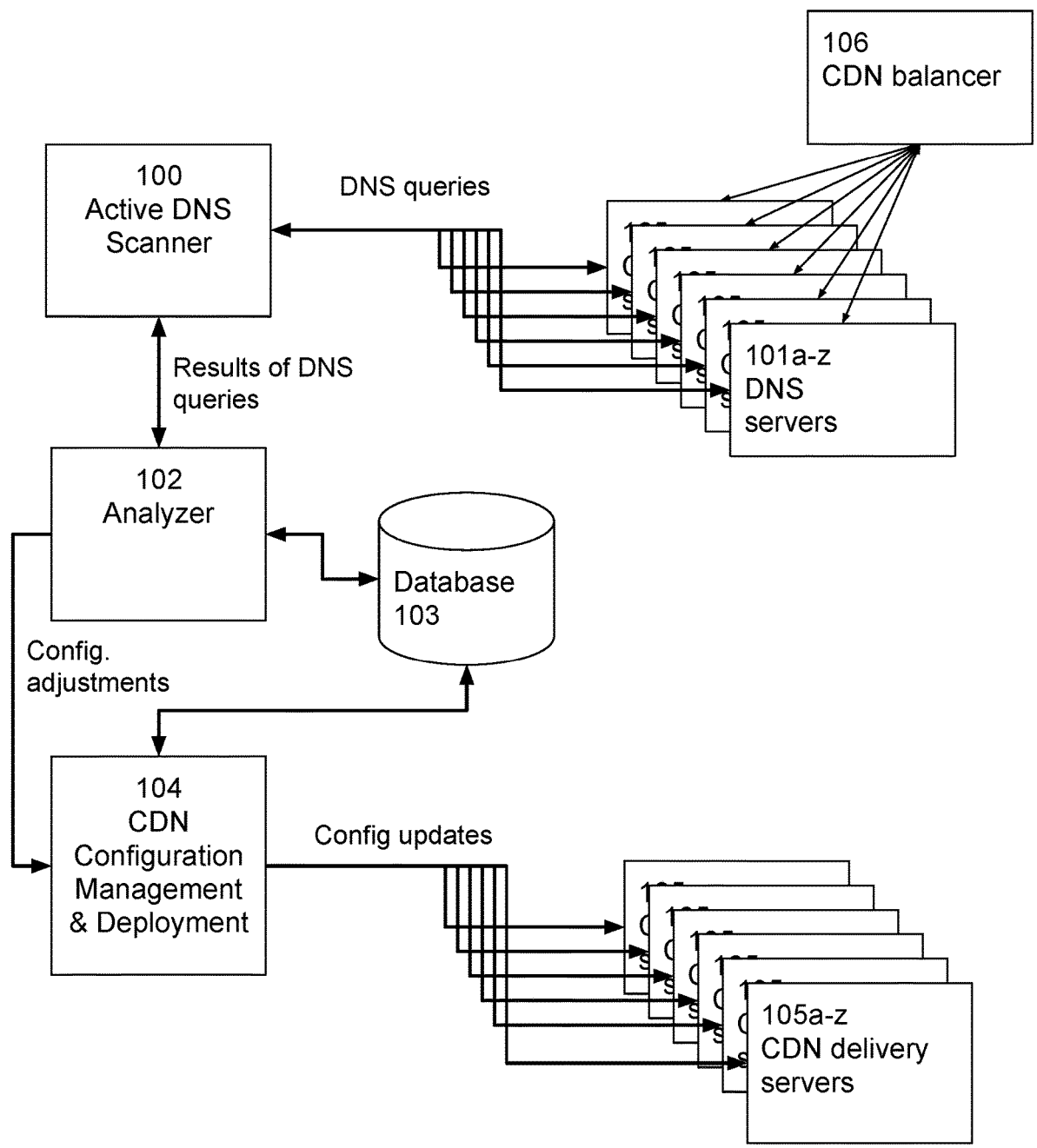
FIG. 1 is a block diagram illustrating one embodiment of a CDN balancing mitigation system, in accord with the teachings hereof.

In one embodiment and with reference to FIG. 1, a system and method incorporates an active DNS scanner 100 with the delivery system of a CDN. The active DNS scanner probes the DNS servers 101*a-z* of a particular content provider customer domain. The DNS servers 101*a-z* typically would be recursive DNS servers in various ISP networks; the CDN balancer (shown as 106 in FIG. 1) would be implemented as an authoritative DNS which the DNS servers 101-*az* query to resolve a hostname, hence the answers from the DNS servers 101*a-z* reflect the decisions made by the CDN balancers. The active DNS scanner 100 also provides competitive intelligence. This data is analyzed (102) in the ways described herein and results in a selection of certain changes to make the CDN configuration for the domain. This is fed to the configuration system (104) of the CDN. In this way, domains deployed on the CDN are monitored, and the system reacts to the detected share of CDN balancing by increasing service levels to indirectly win over more traffic. The results of the scanning and the effect of the CDN configuration adjustments on traffic can be logged in database 103.

The increased service levels can be achieved in many ways, but typically manifest as sets or groups of adjustments to the configuration in the CDN's servers (105*a-z*). These adjustments generally include things like performance enhancing features or changing settings. They are made to determine if they improve performance in a way that is observed to increase traffic share for the CDN, with respect to the set content that is of interest (e.g. under the domain(s) of a given content provider customer of the CDN). Note that increased traffic share may not be a global share, but taken with respect to a particular category of traffic, geography, time slots, or otherwise.

The cycle of scanning and CDN configuration adjustment can attempt to target a new desired share of traffic, whether permanently, temporarily, in cycles, and so forth. Generally, it is safer to avoid configuration changes that might raise traffic levels to the origin systems for a domain, as substantially increasing origin traffic can result in failures. In some cases, however, raising origin traffic slightly can improve performance, however, so that rule is not absolute.

The process of adjusting CDN configurations will affect the delivery of content of CDN customer domains where such domains are employing CDN balancing (e.g., DNS-based load balancing) between multiple CDNs. The multiple CDNs include the CDN implementing the teachings hereof (referred to sometimes as the "implementing CDN"), as well as other competing CDNs, whether commercial CDN or a do-it-yourself (DIY) CDN by a content provider, or a combination thereof. As mentioned earlier, a DIY CDN is a network deployment that mimics or rivals a commercial CDN but is deployed by a single organization for their own benefit, sometimes with a more narrowly-focused feature set. CDN balancing may be based on a performance-based scoring model, whether commercial or home-grown, or based on simple human activity (e.g., report reading).

The performance based scoring that goes into CDN-balancing decisions may be based on a wide variety of metrics. For example:

Metrics associated with the loading of one or more assets over HTTP, such as the TCP/TLS Handshake Time, Time to First Byte (TTFB), Download Time, or any other measurement possibly related to those assets;

Metrics associated with the content type of the object (e.g., time to last byte of a format header embedded within the overall file payload is received by a client, or performance metrics pertaining to Javascript versus HTML content, for example);

Metrics associated with Real User Monitoring (RUM) of web pages, obtained in accord with the Navigation Timing or Resource Timing specifications through a web browser, such as Time to First Paint (TTFP), DomContentLoaded (DCL), or Page Load Time (PLT);

Metrics typically associated with RUM for media players, such as playback time, bitrate, rebuffer rate, etc.;

Metrics that measure the performance of last, middle, or the first-mile networks, such as origin offload, CPU load, CDN capacity, and availability, CDN "think" time, and so forth.

An implementing CDN that improves its performance with respect to one or more of these metrics may start to receive an increased amount of traffic from the content provider, without additional steps. Of course, performance is not the only factor that might be considered in CDN balancing decisions, but when it is, better performance relative to metrics like those above results in more traffic.

CDN balancing systems typically measure performance by repeatedly fetching a test object over HTTP. Although a CDN could focus only on improving that fetch operation, this patent document describes a range of CDN features and settings that may be engaged to increase performance more holistically for most of the objects on the domain.

The teachings hereof apply to a wide variety of content types, including markup language documents, web page objects, streaming media, API results, WebVR, and generally any objects that are available from a CDN (including via HTTP of various versions now and those conceivable in the future, and related protocols such as SPDY, QUIC, WebSockets, WebTransport, and other web-related communications protocols.). Some content provider customers (in the media industry, for example) may use an HTTP transaction to obtain a list or manifest containing URLs pointing to different CDNs from which to load resources. Therefore, improving the performance of media resources loaded by various media players can also automatically shift more traffic towards the implementing CDN.

With the foregoing by way of introduction, components of one embodiment of an exemplary system are now described in detail.

Active DNS Scanner

The active DNS scanner component 100 (referred to as a "scanner") automatically tracks all relevant content provider customer domains across DNS resolvers to detect CDN balancers and the decisions made by them across many geographies and over many samples in a given period of time. The system is configured with a set of domains to scan; typically this includes some or all of the content provider domains being handled by the implementing CDN that are of interest. Data from an active DNS scanner ensures that the list of monitored domains is controlled and results are generally available for every domain on the list, barring technical problems.

The scanner 100 can have a configured list of DNS servers worldwide that accept public DNS requests, along with metadata about the country and state/province in which each is known to be located (this metadata may be created, augmented, or verified, by making use of an IP-address-to-geo database service such as Akamai EdgeScape). For efficiency, upon each run, the scanner can make a random subselection of the DNS servers, selecting at least one per country (at least one, but the number is proportional to the number available in the country), and in each country, at least one per state/province, to make up a selected server list.

The scanner can be loaded with a list of content provider customer domains active on the CDN service for which the implementing CDN wishes to employ this method. This list can be generated via explicit configuration or via an API request to the CDN's configuration system, or scanning webpage HTML, for embedded domains, or using public databases such as HTTP Archive, or using RUM databases such as mPulse, for example. The scanner can iterate through each domain, and for each server on the selected server list, make a DNS request, namely A and/or AAAA requests. For each IP address received, it can issue a PTR request. Because domains using CDNs tend to return a CNAME for the initial domain, and possibly multiple CNAMEs, before terminating the DNS name lookup process with an IP address, the response to a DNS query is called a CNAME chain. The CNAME chain for each request is saved, and errors and timeouts are handled gracefully. The requests may be executed from one server, called a vantage, or from a fleet of servers, or virtual machines, in one location, as DNS servers tend to reply to requesters globally without regard for their source IP address. Alternatively, the requests may be executed from a network of global servers or virtual machines.

The scanner 100 can capture the following data points from a CNAME chain and related lookups:

CDN balancers in use, if any;

the CDN in use if any (which includes commercial CDNs and content provider DIY CDNs);

information about the origin, e.g., the cloud hosting provider at which origin or part of origin service is available (usually if no CDN).

The scanner can do this by employing known techniques, such as substring and regular expression matches to find known CDN identifiers within the CNAME and PTR values, or ASN mapping based on IP address values; as well as employing matches to IP address ranges known to be used by CDNs and cloud providers, or ASN matches on the resolved IP addresses.

The match rules to find "known" CDN identifiers and IP ranges can be configured and periodically updated by manual (or semi-automated) research to reflect industry practices. Some may be well-known to industry and reported on web pages by the entities themselves or by industry commentary; some may be shared by customers to the implementing CDN; other values may be accrued by experts in the practice of their field within the implementing CDN.

As noted, CDN balancing can occur between a CDN and an organization's own DIY CDN. It is also possible that CDN balancing can occur between a CDN and an organization's own origin service that is not recognized as a CDN, i.e., not a DIY CDN. (The line between a DIY CDN and a non-CDN like origin service may be fuzzy at best.) The latter is referred to as 'direct to origin' when making a CDN balancing choice. Direct to origin may be chosen to save on costs. The origin may be hosted at a cloud hosting provider and can likewise be detected. Some of those cloud hosting providers may offer CDN or CDN-like service that competes with commercial CDNs, sometimes only offered for services hosted by the provider.

When the scanner is assessing a domain configured to serve streaming media, an alternative method may be used. In this method, the scanner performs substantially similar steps that a content player would perform, e.g., by initially retrieving a manifest file for a stream, and extracting the URLs therein which point at various CDNs explicitly, identifying the hostname of each URL, applying the same CNAME logic as above, and if necessary, resolving the hostname and applying the same further logic to the results, to arrive at a similar CDN determination.

Aggregated data from the scanner's probes may reveal a CDN traffic split per domain. By selecting all CDNs for a domain, over all servers, over all runs for some period such as a moving 30-day window, a CDN traffic split showing how often the implementing CDN is being chosen, can be determined. In one embodiment, it is both the list of participating CDNs and the counted number of resolutions for each CDN in the set. It could be expressed in a variety of ways, however, such as a summary that provides the CDN of interest and a current traffic share.

This distilled DNS data showing CDN split for subject domains can be sent to a component that analyzes the results and then affects production configuration for the respective domains (102 and 104 in FIG. 1).

Analyzer

The analyzer (102) ingests data from the active DNS scanner 100 and for each domain (or perhaps just those subscribed to the product or service for which the implementing CDN wishes to employ this method) it applies logic to detect multi-CDN usage on a domain. A logical guard may be in place to analyze only domains with an automatic CDN balancer (as known, for example due to specific strings associated with CDN balancers showing up in the CNAME chain).

Domains that are detected as multi-CDN can have various configuration adjustments applied via known CDN configuration/control channel mechanisms. The particular features and settings that can be adjusted are described in more detail below. The goal is to increase performance with respect to key metrics assessed by the CDN balancer, and thereby alter the balance between CDNs used for the domain to better favor (send more traffic to) the implementing CDN. A database or data file 103, including the original scanner database, may be updated to note this production configuration change, in a convenient format for subsequent similar reviews by this same component. Upon subsequent reviews, the analyzer may make further configuration adjustments, adding to or removing those enhancements that were already deployed.

Success in the effort can be measured by observing (post-activation of the configuration adjustments) that the balance between CDNs has been changed to direct more traffic to the implementing CDN. Success could also, or alternatively, be measured by an increase in the amount of traffic (by hits, bytes, or similar metrics following the billing model of the respective customer contract) logged on the implementing CDN. Or both.

An increase for the implementing CDN in the balance between CDNs for a domain can be measured by the scanner 100 re-running the DNS requests probes and detecting that more of the DNS servers in the world are returning a CNAME chain that can be identified to contain indicia of the implementing CDN in a particular run or across multiple runs. A shift in this multi-CDN balance may indicate success even if the traffic level on the implementing CDN has fallen—because traffic levels to domains are, generally speaking, influenced by the diurnal cycle, seasonal trends, holidays, promotions and advertising, competitive failures, and the like, it is possible for traffic to be naturally falling from the peak of such a cycle but at the same time the implementing CDN is receiving a higher fraction of the available traffic.

Continued failure to win additional CDN traffic share may indicate that the CDN balancer is not performance-based or is not affected by the current configuration adjustments in place. It may be fixed or cost-based, for example.

Selecting and Implementing Configuration Adjustments

It is well known that CDNs have configuration channels (an abstraction for version control, distribution, and file or database format) that control various subsystems. See, e.g., U.S. Pat. Nos. 7,240,100 and 9,942,363, the teachings of which are hereby incorporated by reference. Each content provider domain can have a specific configuration that ultimately is pushed or pulled in whole or parts to various appropriate systems, most notably, the front-end HTTP web proxy servers, but also possibly storage, databases, routing, DNS, certificate servers, Web Application Firewall (WAF), logs, monitoring, and so on.

Such known and existing mechanisms for adjusting configuration with respect to specific domains and/or content providers can be leveraged by the system to implement selected configuration changes. Preferably, the configuration adjustments activate and/or change certain sets of CDN features and/or settings to improve performance in various ways. The various features and settings may be grouped into tiers and the tiers activated in a predetermined order. For example, groups of features or setting changes that are considered "safer", that do not change the content itself, or that are less costly or easier to implement for the CDN, may be activated earlier than those that are not. Examples are provided in a later section.

Figure 2:
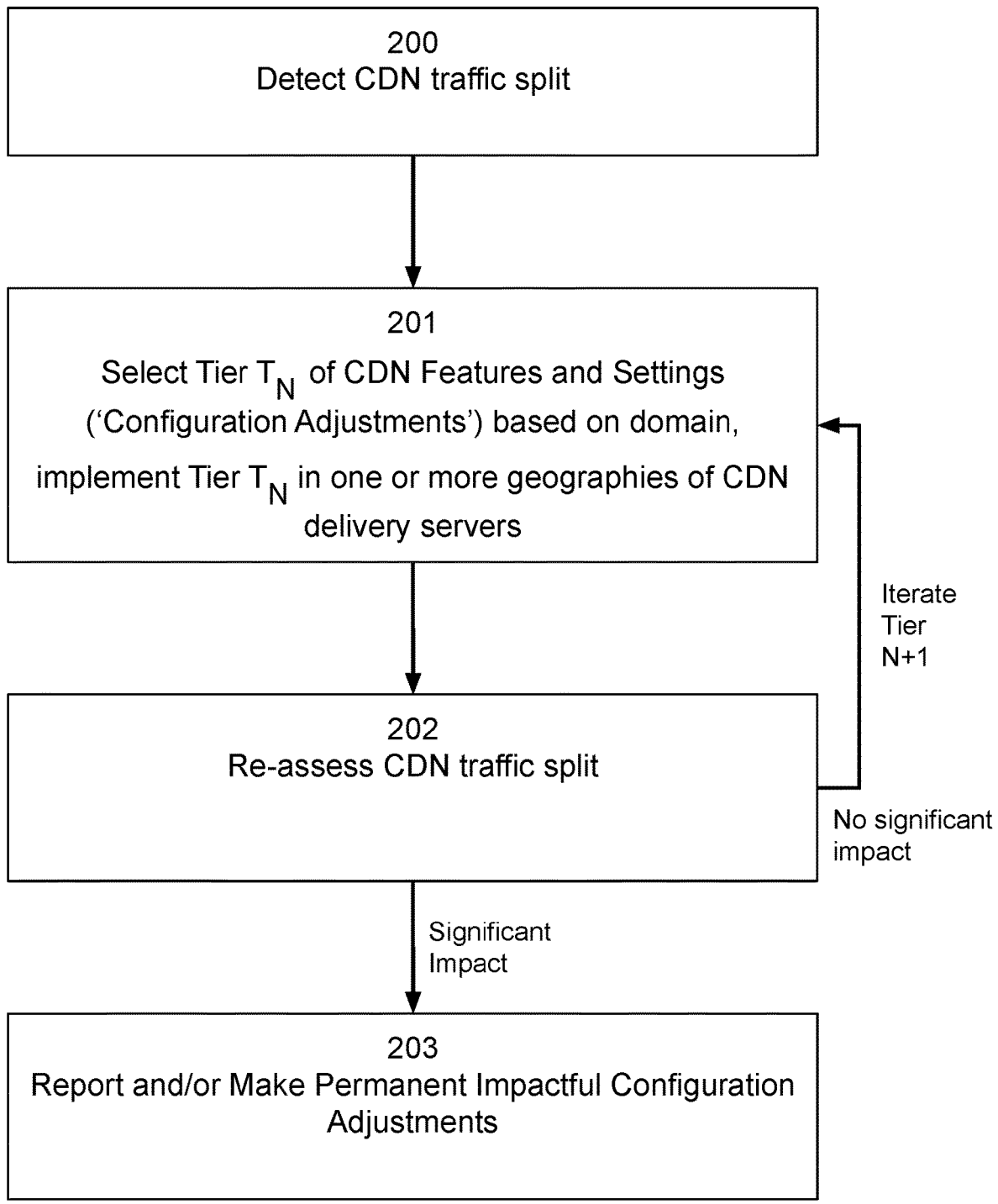
FIG. 2 is a flow diagram illustrating one embodiment of a method, in accord with the teachings hereof and, FIG. 3 is a block diagram illustrating hardware in a computer system that may be used to implement the teachings hereof.

The basic logic for applying successive groups of configuration adjustments is shown in FIG. 2. Of course, at some point, the system exhausts possibilities and may need to report that no changes were impactful.

The meaning of "significant" impact in FIG. 2 depends on the goals. The implementing CDN may target a particular amount of additional net balance or resultant traffic level, although this is not required. It could be a fixed configured threshold, or based on guiding business metrics from the respective customer's contract, such as a level of additional traffic that would gain a marginal price above a configured threshold.

The application of a tier of configuration adjustments may be triggered by a random probability test, as a safety guard (e.g., apply on 80 percent of requests, or other tunable value). This enables a systemic control knob to select for a network cost of applying the treatments as a whole to all customers, or both.

If traffic share gains are insufficient after some initial time period, additional or alternative tiers of configuration adjustments may be engaged, or the probability guards for the active ones raised. In one alternative implementation, the system can proceed through a few tiers, e.g., progress a domain to tier 1, then 2, etc., where progressively higher numbered tiers engage more features and/or make settings more aggressive. A tier system also simplifies reporting to network operations staff and business managers.

The configuration adjustments may be applied for a trial period to see if traffic levels rise, and then if so, hold, or timeout after some period of time that indicates they did not affect multi-CDN balance. Once detected as probably working, they may be then maintained permanently, or temporarily for some configured time, or cycled on and off in order to raise the average balance over time but avoid being on all the time (and groups of domains may be on/off at alternating/cycling times to manage the total number of treated domains at any given moment).

Most configuration adjustments cannot be applied for every domain, lest they lose their benefits due to constrained resources required by them, or because they pose their own network management conundrums. These limits may influence and confine the number of domains analyzed, the number concurrently under test, or the time periods for which they are activated.

As indicated in step 201 in FIG. 2 includes a sub-step of customizing the tiers, or selecting the set of tiers through which the tests will progress. The specific features and settings included in a set tiers may be specific to content-type dominance or cache/no-cache type content on a particular domain. For example, a domain serving mostly images would preferably use an image-specific set of tiers, progressing through them tier 1 to N, whereas a domain with a lot of API content might progress through another set of tiers 1 to N tuned for that content. Which features and settings are placed into which tiers may be human-designed based on factors such as effectiveness, safety & stability, cost, and ease of implementation; some machine learning may be used to select one over another for certain content-types as well.

In some cases, the choice of features and settings in a given tier may be based on the metrics that a detected CDN balancer is known to measure and rely on for decision-making.

Examples of Features and Settings Affected in the CDN Server Configuration Adjustments The table below provides examples of configuration adjustments. These are merely illustrative. The "configuration adjustment" column lists various features and/or settings. It should be understood that a given configuration adjustment can include activating or deactivating or changing the given feature or settings. It can also include adjusting/tuning the feature or setting that is already activated (e.g., allocating more memory, allowing it to be used for more requests, or in a wider array of situations, or generally making it more aggressive).

TABLE A

| Code/Title | Configuration Adjustment (CA) | Expected improvement metric | Mime-type Suitable |
|---|---|---|---|
| CA1 Image Compression | where CDN customer permission or expectation would allow altered content, recompress images at a higher level of compression than origin provided; | time to last byte (TTLastB), throughput | images |
| CA2 Pinning | pinning (delaying or precluding eviction of) the domain's objects in RAM, buffer, or disk | time to first byte (TTFB), hit_rate (i.e., cache hit rate) | static objects |
| CA3 Dedicated Storage | dedicating some amount of disk space to the domain's objects; | TTFB, hit_rate | static objects |
| CA4 Increase Dedicated Storage | increasing the already-dedicated disk space to the domain's objects; | TTFB, hit_rate | static objects |
| CA5 Cloud Origin | copying the domain's objects into cloud storage such as Akamai NetStorage, as an alternative to the origin, where such objects happen to be served from the origin with immutable cacheability notation, or configuration indicates immutability, for a given TTL, and during that TTL serve from this cloud storage if likely faster than origin for a given CDN server; | TTFB, TTLastB, throughput | static objects and maybe dynamic objects too |
| CA6 Cold Mapping | shifting the traffic to a "colder", or a more or less distributed map (with respect to other served domains), i.e. permitting more, or less busy, front-end HTTP servers/proxies to be available to answer requests on behalf of the customer domain, or increasing ASN diversity of Edge servers or Parent servers to minimize performance bottlenecks in specific networks; | TTFB, hit_rate | both static and dynamic content |
| CA7 PCONN | keeping PCONNs (persistent connections) to origins and other regions "warmer" longer, by not closing them as quickly or reestablishing closed PCONNs with a replacement for a longer overall timeout; | TTFB | both static and dynamic content |
| CA8 Priority Keys | prioritizing TLS key generation on Key Management Infrastructure (signing keys) machines for the domain; | TTFB | both static and dynamic content |
| CA9 TLS session tickets | increasing Time To Live (TTL) on Transport Layer Security (TLS) session tickets to increase session resumptions; | TTFB | both static and dynamic content |
| CA10 Priority Links | routing requests on inter-city fiber links (or over dedicated links to the upstream hosting provider where the origin, or part of the origin, is available) by preferring more expensive routes than otherwise; | TTFB, TTLastB, throughput | both static and dynamic content |
| CA11 ICP only | enabling "(Internet Cache Protocol) ICP only" servers at cache hierarchy (a.k.a. cache parent or cache throttling) regions | TTFB | static |

TABLE A-continued

| Code/Title | Configuration Adjustment (CA) | Expected improvement metric | Mime-type Suitable |
|---|---|---|---|
| | that, for certain domains, listen for ICP traffic and make requests for the same objects to peers over ICP, cache the objects, and then serve them back as ICP to peers only, thus expanding cache storage for preferred domains (after a possible warm-up period of normal operation); | | |
| CA12 Deploy | deploying additional CDN data centers to reduce latency inside or outside of the CDN overlay network or increase origin offload; | TTFB, hit_rate | both static and dynamic content |
| CA13 Post Fetching | "post-fetching" an object, the same as pre-freshing but done ahead of the final TTL expiration that is normally the result of the last prefresh before lack of activity lets the prefresh cycle lapse, and repeated, for some lengthier period to keep an object fresh past any current public demand for it, anticipating additional requests "soon", but by only requesting the object from cache hierarchy, or security-barrier servers (a la Akamai SiteShield), but not going forward to origin, thus keeping Edge servers warmer, but not adding origin load; | TTFB, hit_rate | static |
| CA14 Prefetch | "pre-fetching" an object, which is a practice for a CDN server to fetch an object based on its URL appearing in an HTML base page before it is requested from the client to which the HTML is being served, in situations where pre-fetching would not ordinarily occur but it would be safe and practical to do so, except that normal pre-fetching may go to a cache-hierarchy and ultimately to the origin, but in this case, it would usually be desirable to preclude the origin request for reasons above; | TTFB, hit_rate | static |
| CA15 RAM allotment | for requests that need computing on the CDN network, | TTFB with limited impact | Edge computing tasks, |

TABLE A-continued

| Code/Title | Configuration Adjustment (CA) | Expected improvement metric | Mime-type Suitable |
|---|---|---|---|
| | allocating additional RAM resources to keep parsed/compiled customer code warm in RAM ready for execution, or prewarming the parse/compile step on CDN servers that have not yet received requests that would generate that activity but could receive a hit in the near future; | expected | EdgeWorkers (requests that can be processed on the CDN without hitting the origin, for eg via computation and or database lookups) |
| CA16 Increase TTL of DNS Records | increasing the TTL of DNS records, such as CNAME, A, and AAAA, in the CNAME chain returned for the domain, or switching CNAME response values to point to intermediary CNAMEs in the chain that use longer TTLs; | TTFB | both static and dynamic content |
| CA17 Increase Compression | where CDN customer permission or expectation would allow altered content, spending cycles to apply the highest compression levels to compression formats, potentially outside of current HTTP requests, such as applying gzip at level 9 for objects stored in cache gzipped; | TTLastB | text (css, js, html, etc) |
| CA18 TCP CWND | where CDN customer permission or expectation would allow TCP changes, increasing the initial congestion window for Transmission Control Protocol (TCP), or using other TCP optimizations, such as one of TCP congestion control algorithms, or packet pacing, for client-side or midgress connections; | TTLastB, throughput | all (expect very small objects) |

A summary of the domain traffic type and the metrics that might be best candidate for improvement are summarized in the following Table B:

TABLE B

| Domain Traffic Type | Metrics to Improve |
|---|---|
| static content | TTFB, hit_rate |
| dynamic content | TTFB |
| mix of static and dynamic content | TTFB, hit_rate |
| image content | TTFB, hit_rate |
| video content | TTFB, TTLastB, hit_rate, throughput |
| text-based content | TTFB, hit_rate |
| large files | TTLastB, hit_rate, throughput |

TABLE B-continued

| Domain Traffic Type | Metrics to Improve |
|---|---|
| small files | TTFB, hit_rate |
| code to execute on the CDN | TTFB |

Table C below provides example tiering of the configuration adjustments listed in Table A.

TABLE C (tier memberships selected for potential implementation convenience and operational cost)

| | Treatments grouped and ordered by Potential Effectiveness | | | |
|---|---|---|---|---|
| Metric | Tier 1 | Tier 2 | Tier 3 | Tier 4 |
| hit_rate | CA2, CA3 | CA14, CA13 | CA4, CA6, CA12 | |
| TTFB | CA2, CA3, CA7 | CA10, CA8, CA9, CA13, CA14 | CA4, CA11 | CA5, CA6, CA12, CA16 |
| ttLastb | CA18, CA1 | CA17 | CA10 | CA5 |
| throughput | CA18, CA1 | CA10 | CA5 | |
| hit_rate + TTFB | CA2, CA3, CA7 | CA10, CA8, CA9, CA13, CA14 | CA4, CA6, CA11, CA12, | CA5, CA6, CA12, CA16 |
| TTFB + ttLastB + hit_rate + throughput | CA2, CA3, CA7, CA18, CA1 | CA8, CA9, CA10, CA13, CA14, CA17 | CA4, CA5, CA6, CA10, CA11, CA12 | CA5, CA6, CA12, CA16 |
| ttLastB + hit_rate + throughput | CA2, CA3, CA18, CA1 | CA10, CA14, CA13, CA17 | CA4, CA5, CA6, CA10, CA12 | CA5 |

Discrete Example of Method

Here is an example of how a domain, www.example.com, hosted on an implementing CDN, can be processed by the systems and methods described in this patent document.

Using the active DNS scanner 100, resolve the domain www.example.com on a set of public DNS servers 101a-z. Multiple queries may be issued against each DNS server that is queried. Collectively these queries for one domain at one DNS server are referred to in this example as a "lookup". In some cases, the scan across servers can be repeated after a configured time period, say 48 hours, using a newly randomized selection of servers each time, and the results appended to the first results.

The results of the lookups are processed by the analyzer 102. Namely, the query results for one lookup are reduced to one discovered CDN, or none. All CDN matches for the implementing CDN are counted ("x"), and all valid answers at all are counted ("n") which is then used to calculate a ratio x/n representing the portion of answers that are of the implementing CDN. If the implementing CDN is not mentioned in DNS answers for a domain, then x/n=0. If the implementing CDN is mentioned in all DNS answers, then x/n=1. Because this measurement x/n is at time zero we may notate it as x/n @ t=0. Next, a metric capturing the effect of Direct to Origin can be measured. Let "c" be the count of all CDN matches. For a domain where only CDNs are used, n=c, but for a domain that balances Direct To Origin as well, it may be that c<n if origin is not recognized as a CDN per se. Thus x/c is a proportional competitive measure excluding Direct to Origin. As those in the art will appreciate, a similar metric can be developed to exclude DIY CDN for those instances in which the origin service is actually recognized as a CDN.

The next step is to select and begin applying tiers of CDN configuration adjustments. If x/n is less than some threshold (e.g., 0.5) for a domain, engage tier 1 configuration adjustments, then wait some period to allow for them to have effect (e.g. 48 hours). Tier 1 configuration adjustments may be, for example, configuration adjustments Pinning, Cold Mapping, and Increase TTL of DNS records as in the Table A above; where:

Pinning is implemented by allocating space on a "premium" SSD drive in each CDN server for additional storage of objects associated with www.example.com (e.g. 5% of such space among 20 similarly-treated domains);

Cold Mapping is implemented by altering a CNAME in the CNAME chain to a map of web servers larger than the standard configuration for the delivery product used (e.g. 20% more points-of-presence); and Increase TTL of DNS Records is implemented by retaining all objects and keeping them valid via required refreshes (to parents and servers near origin only) through a period of at least 24 hours past last access on each server.

Note that application of CDN configuration adjustments in certain tiers may affect performance only under certain conditions or circumstances, for example, only in certain geographical locations. An analysis of how the activation of tier impacts performance under various conditions can be performed. This might involve keeping the configuration adjustments turned on in conditions where performance improves but turn the treatments off in conditions where performance degrades. Alternatively, configuration adjustments could be applied to one geolocation (CDN cluster) at a time to perform controlled enablement of treatments.

Next, the effect of the configuration adjustments on the CDN split is assessed. This involves repeating the measurements by the Active DNS Scanner, to compute x/n @ t=1. If this value is greater than x/n @ t=0, by more than a threshold value (e.g. 0.04, or 4%), then an improvement is deemed to have been detected.

If tier 1 succeeds in significantly improving the split in favor of the implementing CDN, tier 2 may be engaged. Tier 2 can be engaged concurrently with tier 1, if the tiers are arranged as "try more" tiers; or, if tier 1 fails, tier 1 can be deactivated in favor of tier 2, if tiers are arranged as "try instead". (Tier 2 treatments may be, e.g. the configuration adjustments Boost Compression', "TCP CWND', and 'Compress Images' in Table A).

After each tier is engaged, the effect may be measured once more by repeating the active DNS scanner 100 measurements and testing against the threshold value.

At the end of the testing period, release all tiers, wait a configured time period for the change to take effect (e.g. 48 hours), and then retest with the Active DNS Scanner to ensure that x/n @ t=current drops relative to prior reading(s). If so, this is the secondary confirmation that configuration adjustments are deemed effective, and after a resting period (e.g. 14 days), go back to the beginning. If not, then discontinue the method on this domain until overridden by a human operator, or wait a long grace period (e.g. 1 year) and go back to the beginning.

If, for any given tier, a positive effect is detected, then the circumstances may be recorded and reported out to the CDN personnel. Alternatively, or in addition, the tier's adjustments can be kept activated for a time (e.g. 14 days), and periodic rechecks may be done to verify whether the improved traffic split has persisted. In this regard, the comparison can be made with respect to the current result, the previous result, or the original result, or a moving average of results.

Domains of interest may be scanned regularly and the logic above may be adjusted such that required scans align with (and use) already-recurring scans in that model; also regular scans can show how quickly CDN adjustments are realized in CDN balancing. This information can be used to inform the design and maintenance of the system described herein, including adjustments to the various timings mentioned above.

In the case where the implementing CDN does not have the ability to apply the necessary features and settings for all content provider customer domains that are found to be using multiple CDNs, the configuration adjustments may be applied to customers that, for example, are the highest paying customers of the implementing CDN, or some other factor. In the case where implementing CDN has different capacities for enabling different tiers, for example, applying Tier 1 to only three content provider customer domains at a time and applying Tier 2 to seven content provider customers at the same time, customers could be ranked based on several factors for each of the Tier to be enabled.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 3:
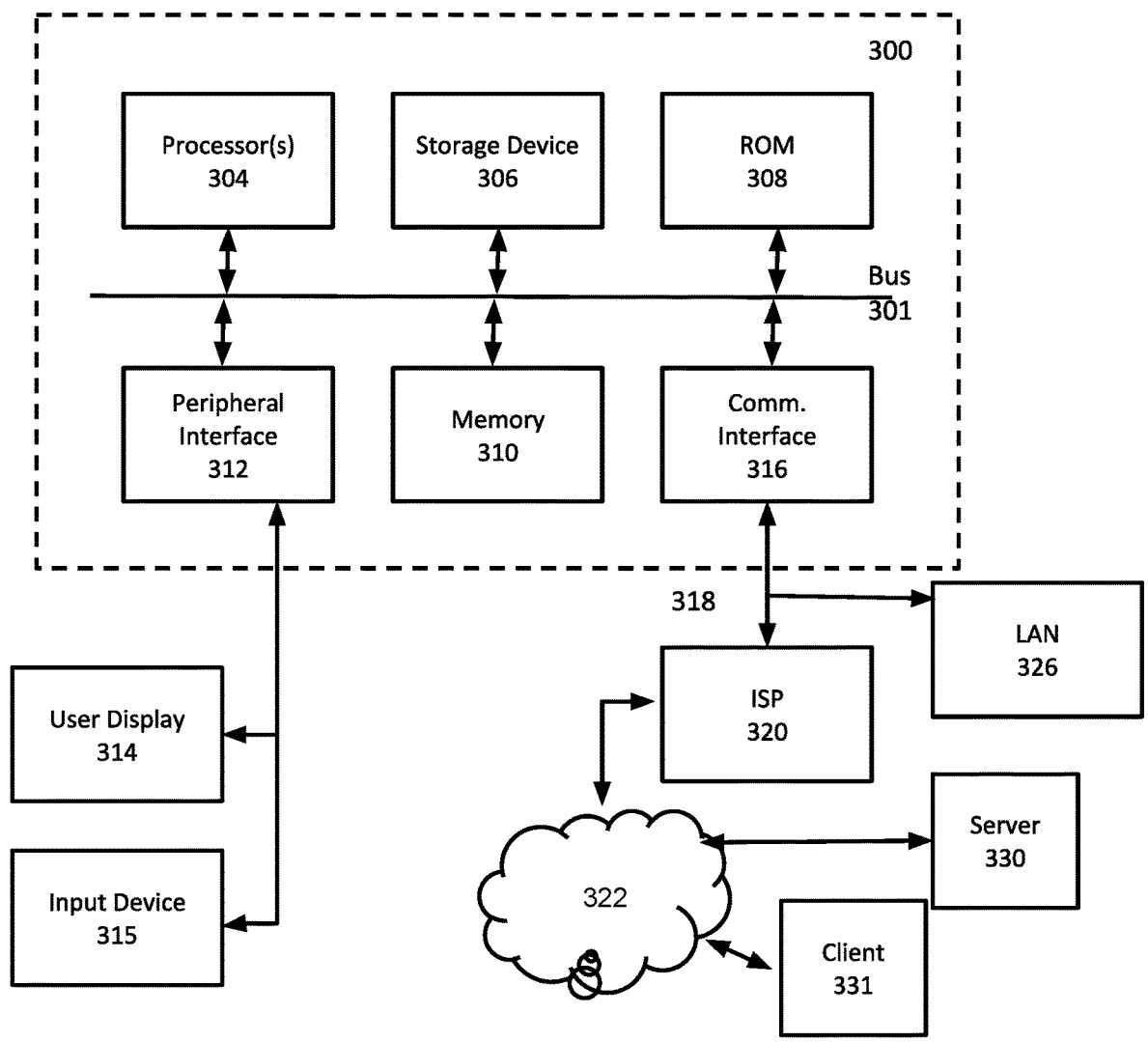

FIG. 3 is a block diagram that illustrates hardware in a computer system 300 upon which such software may run in order to implement embodiments of the invention. The computer system 300 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 300 includes a microprocessor 304 coupled to bus 301. In some systems, multiple processor and/or processor cores may be employed. Computer system 300 further includes a main memory 310, such as a random access memory (RAM) or other storage device, coupled to the bus 301 for storing information and instructions to be executed by processor 304. A read only memory (ROM) 308 is coupled to the bus 301 for storing information and instructions for processor 304. A non-volatile storage device 306, such as a magnetic disk, solid state memory (e.g., flash memory), or optical disk, is provided and coupled to bus 301 for storing information and instructions. Other application-specific integrated circuits (ASICs), field programmable gate arrays (FPGAs) or circuitry may be included in the computer system 300 to perform functions described herein.

A peripheral interface 312 may be provided to communicatively couple computer system 300 to a user display 314 that displays the output of software executing on the computer system, and an input device 315 (e.g., a keyboard, mouse, trackpad, touchscreen) that communicates user input and instructions to the computer system 300. However, in many embodiments, a computer system 300 may not have a user interface beyond a network port, e.g., in the case of a server in a rack. The peripheral interface 312 may include interface circuitry, control and/or level-shifting logic for local buses such as RS-485, Universal Serial Bus (USB), IEEE 1394, or other communication links.

Computer system 300 is coupled to a communication interface 316 that provides a link (e.g., at a physical layer, data link layer,) between the system bus 301 and an external communication link. The communication interface 316 provides a network link 318. The communication interface 316 may represent an Ethernet or other network interface card (NIC), a wireless interface, modem, an optical interface, or other kind of input/output interface.

Network link 318 provides data communication through one or more networks to other devices. Such devices include other computer systems that are part of a local area network (LAN) 326. Furthermore, the network link 318 provides a link, via an internet service provider (ISP) 320, to the Internet 322. In turn, the Internet 322 may provide a link to other computing systems such as a remote server 330 and/or a remote client 331. Network link 318 and such networks may transmit data using packet-switched, circuit-switched, or other data-transmission approaches.

In operation, the computer system 300 may implement the functionality described herein as a result of the processor executing code. Such code may be read from or stored on a non-transitory computer-readable medium, such as memory 310, ROM 308, or storage device 306. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 318 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method of automatically testing content delivery network configurations, the method performed by one or more computers, the method comprising:
    monitoring a set content being delivered on behalf of a content provider to determine that the set of content is being delivered to end user clients by multiple content delivery networks (CDNs)
    determining a share of the set of content that is being delivered by a particular CDN of the multiple CDNs;
    responsive to said determination of the share of the set of content, automatically implementing one or more testing cycles, where a given testing cycle comprises:
        (i) activating a set of one or more performance features on servers of the particular CDN with respect to set of content,
        (ii) determining an updated share of the set of content that is being delivered by the particular CDN, and,
        (iii) logging the updated share of the set of content for any reporting and permanent activation;
    wherein the set of one or more performance features are chosen to be different for each of the one or more testing cycles.

2. The method of claim 1, wherein the given testing cycle further comprises: (iv) de-activating the set of one or more performance features.

3. The method of claim 1, further comprising: selecting the one or more performance features based on a content type applicable to the set of content.

4. The method of claim 1, wherein the updated share of the set of content comprises controlling for any external cycles and external events that affect overall demand for content of the content provider since the earlier determination of the share of the set of content.

5. A system for automatically testing content delivery network configurations, the system comprising one or more computers associated with a particular content delivery network (CDN), each having at least one hardware processor and memory storing instructions for execution on the at least one hardware processor that when executed operate the system to:
    monitor a set of content being delivered on behalf of a content provider to determine that the set of content is being delivered to end user clients by multiple content delivery networks (CDNs);
    determine a share of the set of content that is being delivered by a particular CDN of the multiple CDNs;
    responsive to said determination of the share of the set of content automatically implement one or more testing cycles, where a given testing cycle comprises:
        (i) activate a set of one or more performance features on servers of the particular CDN with respect to set of the content,
        (ii) determine an updated share of the set of content that is being delivered by the particular CDN, and,
        (iii) log the updated share of the set of content for any of reporting and permanent activation;
    wherein the set of one or more performance features are chosen to be different for each of the one or more testing cycles.

6. The system of claim 5, wherein the given testing cycle further comprises: (iv) de-activating the set of one or more performance features.

7. The system of claim 5, further comprising: selecting the one or more performance features based on a content type applicable to the set of content.

8. The system of claim 5, wherein determining the updated share of the set of content comprises controlling for any of external cycles and external events that affect overall demand for content of the content provider since the earlier determination of the share of the set of content.

9. A non-transitory computer readable medium holding computer program instructions for execution on at least one hardware processor, the computer program instructions including instructions for:
    monitoring a set of content being delivered on behalf of a content provider to determine that the set of content is being delivered to end user client device by multiple content delivery networks (CDNs);
    determining a share of the set of content that is being delivered by a particular CDN of the multiple CDNs;
    responsive to said determination of the share of the set of content, automatically implementing one or more testing cycles, where a given testing cycle comprises:
        (i) activating a set of one or more performance features on servers of the particular CDN with respect to the set of content,
        (ii) determining an updated share of the set of content that is being delivered by the particular CDN, and,
        (iii) logging the updated share of the set of content for any of reporting and permanent activation;
    wherein the set of one or more performance features are chosen to be different for each of the one or testing cycles.

10. The non-transitory computer readable medium of claim 9, wherein the given testing cycle further comprises: (iv) de-activating the set of one or more performance features.

11. The non-transitory computer readable medium of claim 9, wherein the computer program instructions further comprise instructions for: selecting the one or more performance features based on a content type applicable to the set of content.

12. The non-transitory computer readable medium of 9, wherein determining the updated share of the set of content comprises controlling for any of external cycles and external events that affect overall demand for content of the content provider since the earlier determination of the share of the set of content.

\* \* \* \* \*